(12) United States Patent
Weng

(10) Patent No.: US 6,952,344 B2
(45) Date of Patent: Oct. 4, 2005

(54) COUPLING UNIT FOR COUPLING A DOCKING STATION TO A PORTABLE ELECTRONIC DEVICE

(75) Inventor: Shih-Lung Weng, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 119 days.

(21) Appl. No.: 10/460,114

(22) Filed: Jun. 11, 2003

(65) Prior Publication Data

US 2003/0231464 A1 Dec. 18, 2003

(30) Foreign Application Priority Data

Jun. 13, 2002 (TW) ........................................ 91112921 A
Oct. 28, 2002 (TW) ........................................ 91217267 U

(51) Int. Cl.[7] ................................................ G06F 1/16
(52) U.S. Cl. ...................................... 361/686; 710/303
(58) Field of Search .............................. 361/683, 686, 361/725, 726, 732, 740, 747, 754, 798, 801; 710/303, 304; 312/223.1, 223.2

(56) References Cited

U.S. PATENT DOCUMENTS

| | | | | |
|---|---|---|---|---|
| 5,142,458 A | * | 8/1992 | Brunson | 362/184 |
| 6,583,985 B2 | * | 6/2003 | Nguyen et al. | 361/686 |
| 6,697,252 B2 | * | 2/2004 | Maeda | 361/686 |
| 6,744,627 B2 | * | 6/2004 | Won et al. | 361/686 |

* cited by examiner

*Primary Examiner*—Lynn Feild
*Assistant Examiner*—Anthony Q. Edwards
(74) *Attorney, Agent, or Firm*—Ladas & Parry LLP

(57) ABSTRACT

A coupling unit for coupling a portable electronic device to a docking station includes a frame part mounted in the docking station and formed with an inclined rail member, and an engaging member that is slidable along the rail member between upper and lower ends of the rail member. The portable electronic device is formed with a slot with an enlarged end and an extension reduced from the enlarged end. The engaging member engages the extension when moved to the lower end of the rail member, and is vertically aligned with the enlarged end when moved to the upper end of the rail member.

12 Claims, 12 Drawing Sheets

COUPLING UNIT FOR COUPLING A DOCKING STATION TO A PORTABLE ELECTRONIC DEVICE

CROSS-REFERENCE TO RELATED APPLICATION

This application claims priority of Taiwanese Application No. 091112921, filed on Jun. 13, 2002, and Taiwanese Application No. 091217267, filed on Oct. 28, 2002.

BACKGROUND OF THE INVENTION

1. Field of the Invention

This invention relates to a coupling unit, more particularly to a coupling unit for coupling a docking station to a portable electronic device, such as a notebook computer.

2. Description of the Related Art

FIGS. 1 and 2 illustrate a conventional docking station for receiving a portable electronic device 100, such as a notebook computer, thereon. The docking station includes a housing 10 for receiving docking circuitry (not shown) therein so as to provide an interface between the portable electronic device 100 and peripheral equipment. A pair of positioning posts 11 project upwardly from a docking wall 101 of the docking station into positioning holes (not shown) in a bottom wall of a housing of the portable electronic device 100. A pair of latches 15 project upwardly from the docking wall 101 of the docking station into locking holes (not shown) in the bottom wall of the housing of the portable electronic device 100 (not shown) for securing the portable electronic device 100 to the docking station.

The conventional docking station is disadvantageous in that a relatively large amount of holes are required to be formed in the housing of the portable electronic device 100 to permit mounting and securing of the portable electronic device 100 onto the docking station and that these holes span a relatively large area, which has an adverse effect on the reduction in the size of the portable electronic device 100.

SUMMARY OF THE INVENTION

Therefore, it is an object of the present invention to provide a coupling unit for a docking station that is capable of overcoming the aforementioned drawback of the prior art.

According to this invention, there is provided a coupling unit for docking a portable electronic device to a docking station that is vertically aligned with the portable electronic device along a vertical direction. The portable electronic device is formed with a first engaging member. The coupling unit is adapted to be mounted in the docking station, and comprises: an elongated frame part extending in a longitudinal direction that is adapted to be perpendicular to the vertical direction, having top and bottom ends, and formed with an inclined rail member that extends downwardly and inclinedly relative to the vertical direction and to the longitudinal direction from the top end to the bottom end of the frame part and that has upper and lower ends; and a second engaging member adapted to extend outwardly in the vertical direction through the docking station toward the portable electronic device and mounted slidably on the rail member so as to be slidable along the rail member between the upper and lower ends of the rail member in such a manner that the second engaging member is adapted to engage the first engaging member when positioned at the lower end of the rail member and that the second engaging member is adapted to disengage from the first engaging member when positioned at the upper end of the rail member.

BRIEF DESCRIPTION OF THE DRAWINGS

In drawings which illustrate an embodiment of the invention.

DETAILED DESCRIPTION OF THE PREFERRED EMBODIMENT

Figure 1:
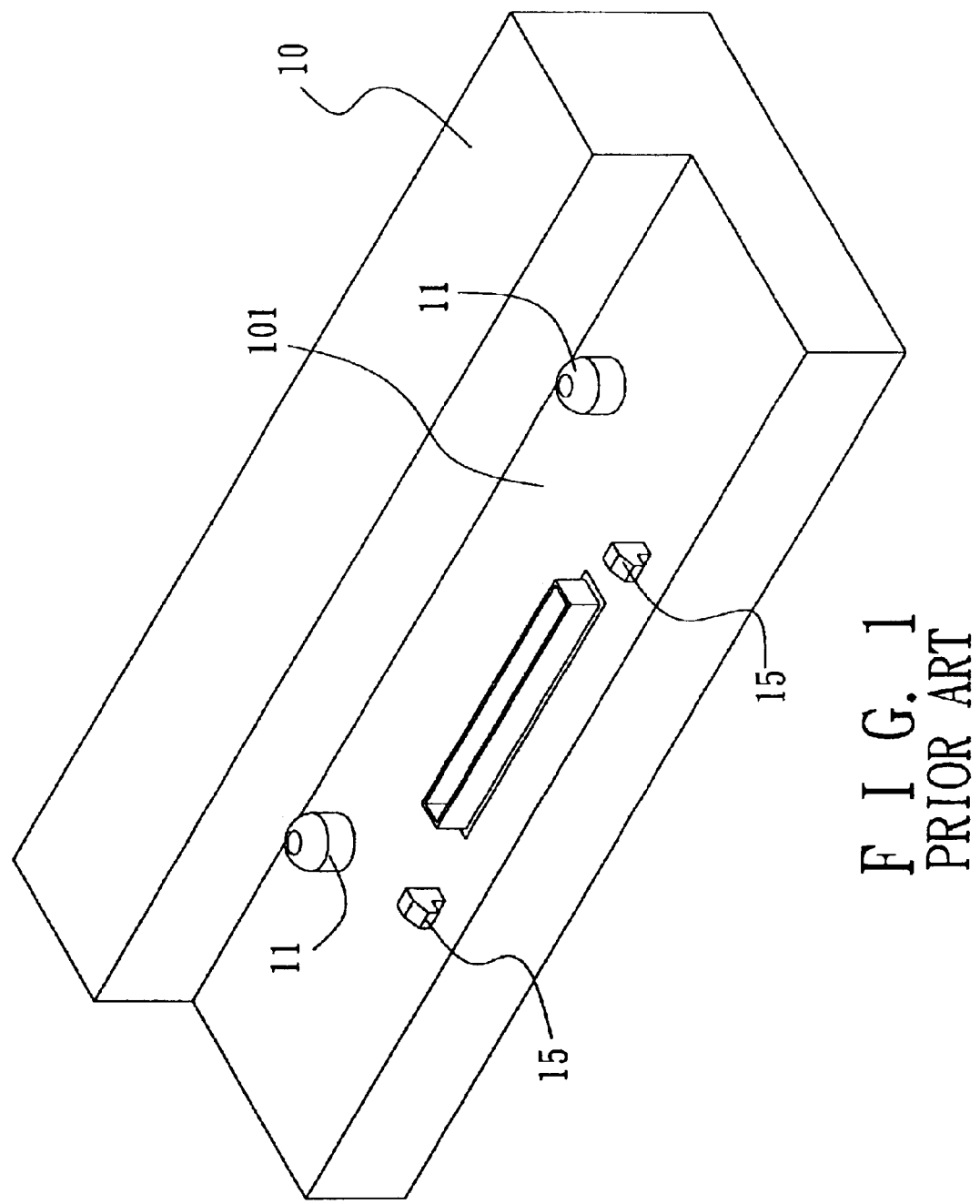
FIG. 1 is a perspective view of a conventional docking station for a notebook personal computer.
Figure 2:
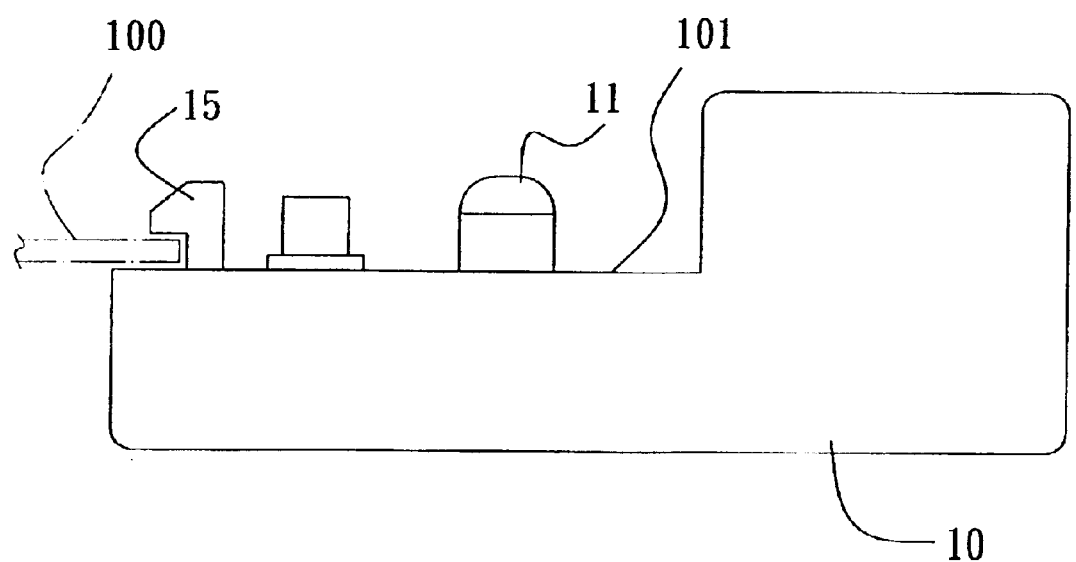
FIG. 2 is a side view to illustrate how the docking station of FIG. 1 is coupled to the notebook personal computer.
Figure 3:
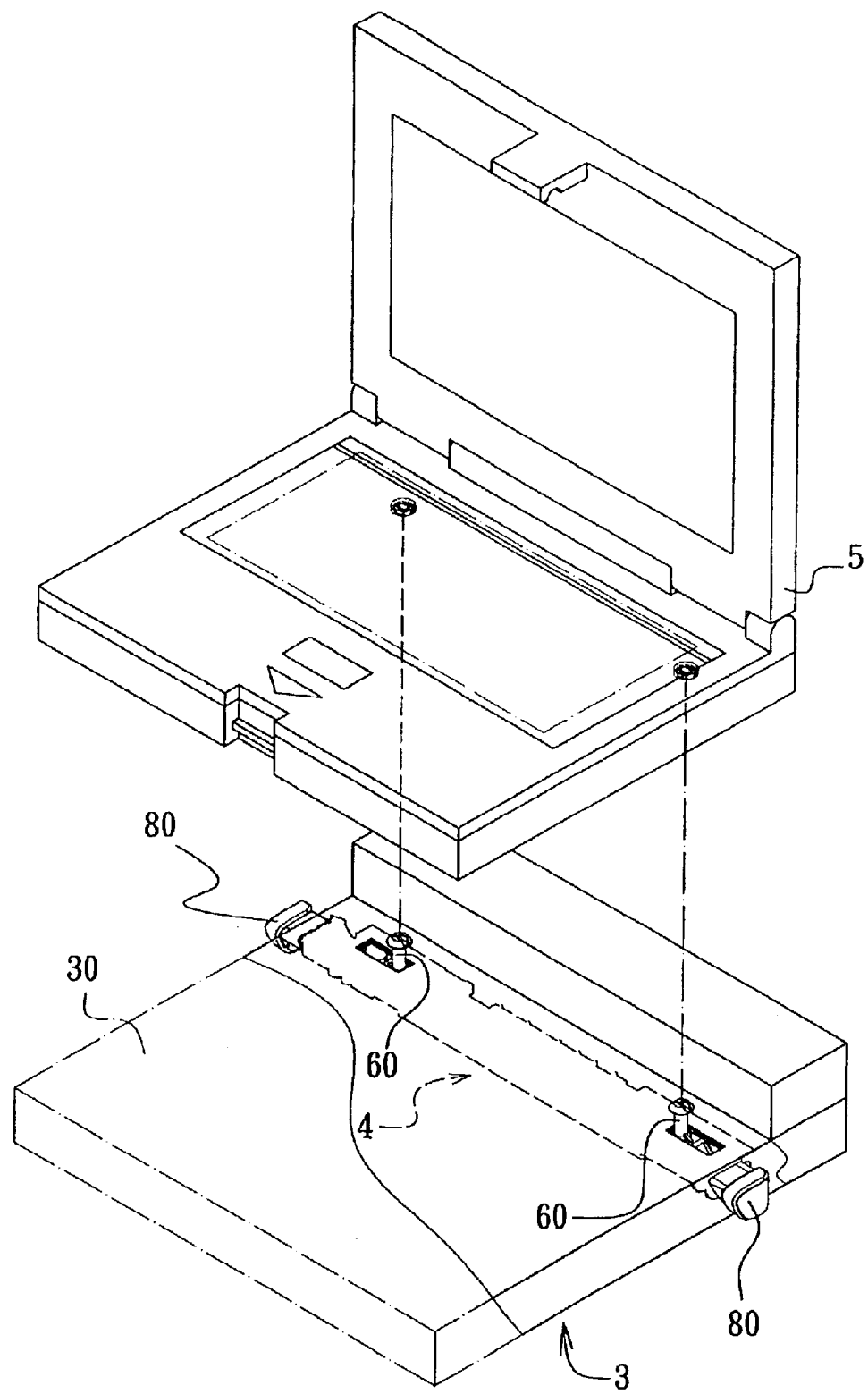
FIG. 3 is a perspective view of a docking station with a coupling unit embodying this invention for securing a notebook personal computer to the docking station.

FIGS. 3 to 9 illustrate a preferred embodiment of a coupling unit 4 of this invention for coupling a docking station 3 to a portable electronic device 5, such as a notebook personal computer. The coupling unit 4 is adapted to be securely mounted in the docking station 3. The portable electronic device 5 has a bottom mounting wall 43 (see FIG. 6) that is adapted to be mounted on a top docking wall 30 of the docking station 3. The portable electronic device 5 includes a first engaging member having an elongated slot 431 which is formed in the bottom mounting wall 43, which extends in a longitudinal direction and which has an enlarged end 4310 and an extension 4311 extending and reduced from the enlarged end 4310 in the longitudinal direction. The docking station 3 is vertically aligned with the portable electronic device 5 along a vertical direction that is perpendicular to the longitudinal direction.

The coupling unit 4 includes two halves which are the same in structure. Each of the halves of the coupling unit 4 includes: an elongated frame part 41 (see FIGS. 4 and 7) extending in the longitudinal direction, having top and bottom ends 401, 402, and formed with an inclined rail member 41 that extends downwardly and inclinedly relative to the vertical direction and to the longitudinal direction from the top end 401 to the bottom end 402 of the frame part 41 and that has upper and lower ends 411, 412; and a pair of second engaging members 42, each of which includes an engaging post 60 that has an enlarged top head 601 and that is adapted to extend outwardly and upwardly through the top docking wall 30 of the docking station 3 and the enlarged end 4310 of the elongated slot 431 then into the portable electronic device 5 (see FIG. 6). The enlarged top head 601 of the engaging post 60 has a cross-section smaller than that of the enlarged end 4310 of the elongated slot 431 and bigger than that of the extension 4311 of the elongated slot 431. The second engaging member 42 is mounted slidably on the rail member 41 and is slidable along the rail member 41 between the upper and lower ends 411, 412 of the rail member 41 (see FIGS. 8 and 9) in such a manner that the engaging post 60 is adapted to move to the extension 4311 of the elongated slot 431 and that the enlarged top head 601 engages releasably a periphery of the extension 4311 of the elongated slot 431 when positioned at the lower end 412 of the rail member 41 (see FIGS. 6 and 8), thereby preventing separation of the portable electronic device 5 from the docking station 3, and that the engaging post 60 is adapted to move from the extension 4311 of the elongated slot 431 to the enlarged end 4310 of the elongated slot 431 when positioned at the upper end 411 of the rail member 41 (see FIGS. 6 and 7), thereby permitting separation of the portable electronic device 5 from the docking station 3.

The second engaging member 42 includes a sliding plate 61 extending in the longitudinal direction. The engaging post 60 projects upwardly from the sliding plate 61. The frame part 40 includes a base plate 403 extending in the longitudinal direction and having two opposite sides, and a pair of parallel side plates 43 extending upwardly and respectively from the opposite sides of the base plate 403. Each of the side plates 43 is formed with a pair of parallel inclined grooves 44 and an inclined rail 45 between the inclined grooves 44. The inclined rails 45 of the side plates 43 cooperatively define the inclined rail member 41. The sliding plate 61 is formed with a pair of parallel elongated openings 603 that extend in the longitudinal direction and that are slidably and respectively sleeved on the rails 45, thereby permitting sliding movement of the second engaging member 42 along the rails 45. The engaging post 60 is disposed between the openings 603.

The sliding plate 61 has two opposite sides extending in the longitudinal direction. The coupling unit 4 further includes a pair of first urging members 607, each of which has two opposite ends that are respectively connected to a respective one of the side plates 43 of the frame part 40 and a respective one of the opposite sides of the sliding plate 61 so as to urge the second engaging member 42 to move to the upper end 411 of the rail member 41.

Each of the inclined grooves 44 in the side plates 43 of the frame part 40 is defined by a groove-defining wall that is formed with an upper recess 431 adjacent to the upper end 411 of the rail member 41, and has a lower end 441 opposite to the upper recess 431. Each of the side plates 43 is further formed with a pair of lower recesses 432, each of which extends from the lower end 441 of a respective one of the inclined grooves 44 in the longitudinal direction. The sliding plate 61 has a first end 611 with two opposite corners 602, and a second end 612 with two opposite corners 604. The corners 602, 604 of the first and second ends 611, 612 of the sliding plate 61 are respectively received in the upper recesses 431 in the groove-defining walls of the inclined grooves 44 when the second engaging member 42 is positioned at the upper end 411 of the rail member 41 (see FIG. 9). In addition, the corners 602, 604 of the first and second ends 611, 612 of the sliding plate 61 are respectively received in the lower recesses 432 in the side plates 43 when the second engaging member 42 is positioned at the lower end 412 of the rail member 41 (see FIG. 8).

A retaining member 46 is disposed movably between the side plates 43 of the frame part 40 adjacent to the second end 612 of the sliding plate 61, and has a retaining tongue 406 projecting therefrom. The retaining tongue 406 is formed with an inclined upper face 407 which extends inclinedly relative to the vertical direction and the base plate 403. The retaining member 46 is movable between a first position, in which the retaining tongue 406 is vertically aligned with the second end 612 of the sliding plate 61, and a second position, in which the retaining tongue 406 is offset from the second end 612 of the sliding plate 61 in the longitudinal direction. A second urging member 704 abuts against and urges the retaining member 46 to move to the second position. The retaining member 46 is associated with the sliding plate 61 in such a manner that the inclined upper face 407 is disposed beneath the second end 612 of the sliding plate 61 when the retaining member 46 is positioned at the first position (see FIG. 9) while the second engaging member 42 is positioned at the upper end 411 of the rail member 41, and that the inclined upper face 407 is pushed by and slides over the second end 612 of the sliding plate 61 against the urging action of the second urging member 704 during sliding movement of the second engaging member 42 to the lower end 412 of the rail member 41, thereby resulting in movement of the retaining member 46 to the second position and disengagement between the second end 612 of the sliding plate 61 and the inclined upper face 407, which, in turn, results in restoring of the retaining member 46 to the first position by the urging action of the second urging member 704 and disposal of the retaining tongue 406 above the second end 612 of the sliding plate 61, thereby preventing upward movement of the second engaging member 46 from the lower end 412 of the rail member 41.

The frame part 40 further includes a first abutting plate 462 projecting upwardly from the base plate 403 between the side plates 43. The retaining member 46 is disposed between the sliding plate 61 and the first abutting plate 462, and includes an elongated body 463 that has opposite first and second ends 4631, 4632 and two opposite side walls 4633 extending in the longitudinal direction. The retaining tongue 406 projects from the first end 4631 of the elongated body 463. The elongated body 463 is formed with a first pin 703 that projects from the second end 4632 of the elongated body 463 through the first abutting plate 462. The second urging member 704 is sleeved on the first pin 703, and abuts against the first abutting plate 462 and the second end 4632 of the elongated body 463. Each of the side walls 4633 is formed with a first tab 4634 that projects outwardly therefrom. The coupling unit 4 further includes a releasing member 47 that is mounted movably on the frame part 40 and that includes a button 80 adapted to be mounted on an exterior of the docking station 3 for moving the releasing member 47, an extending part 81 connected to the button 80 and extending therefrom in the longitudinal direction into the frame part 40, and a pair of opposing second tabs 803 projecting from the extending part 81 and abutting respectively against the first tabs 4634 of the side walls 4633 of the elongated body 463 of the retaining member 46. The releasing member 47 is movable between a releasing position (see FIG. 11), in which the retaining member 46 is moved to the second position by pushing action of the second tabs 803 against the first tabs 4634 upon pressing of the button 80, thereby releasing the second end 612 of the sliding plate 61 from the retaining tongue 406 and permitting upward movement of the second engaging member 42 to the upper end 411 of the rail member 41, and a non-releasing position (see FIG. 10), in which the first tabs 4634 are released from the pushing action of the second tabs 803, thereby resulting in restoring of the retaining member 46 to the first position by the urging action of the second urging member 704.

Figure 4:
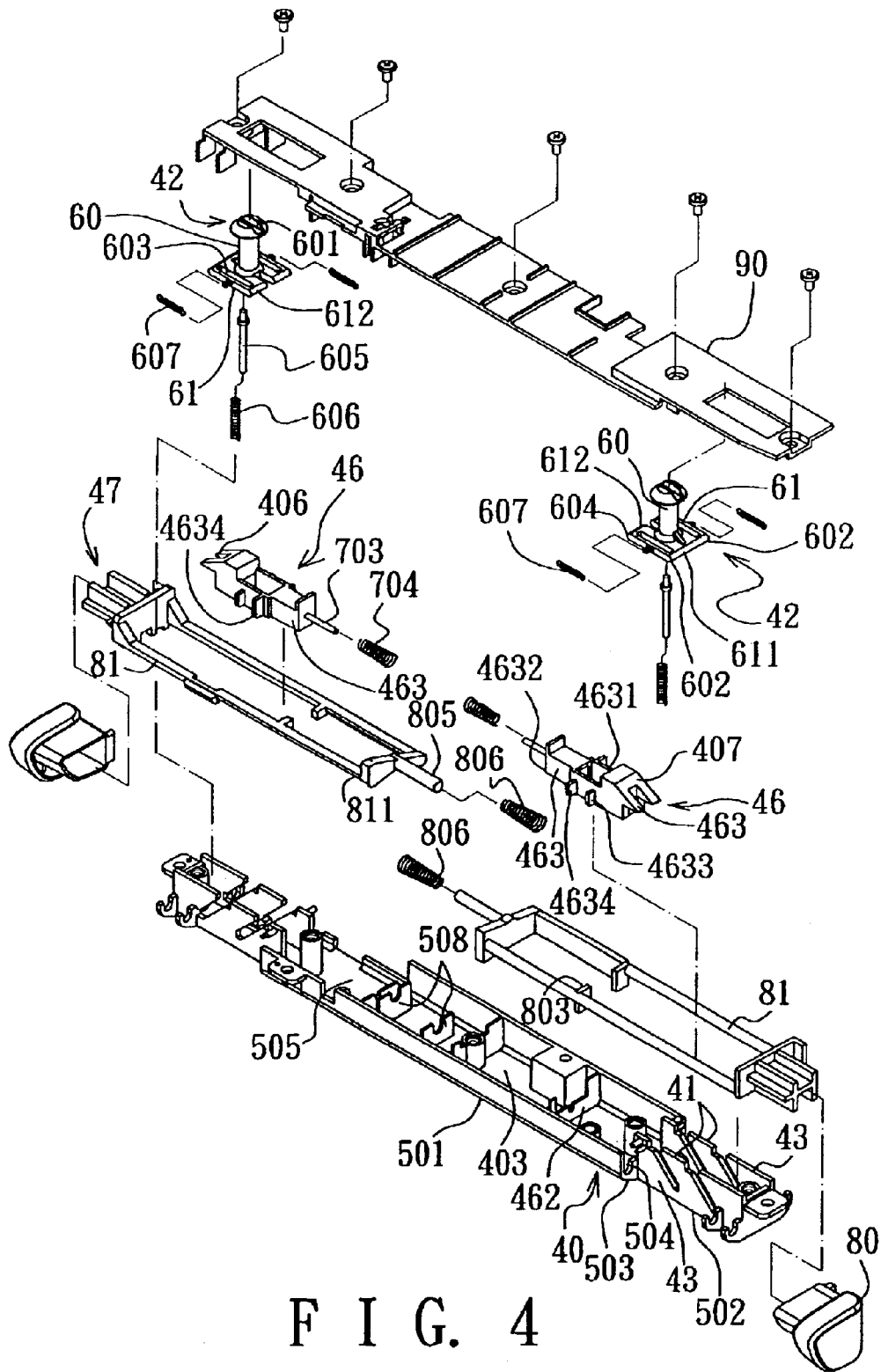
FIG. 4 is an exploded perspective view of the coupling unit of FIG. 3.
Figure 5:
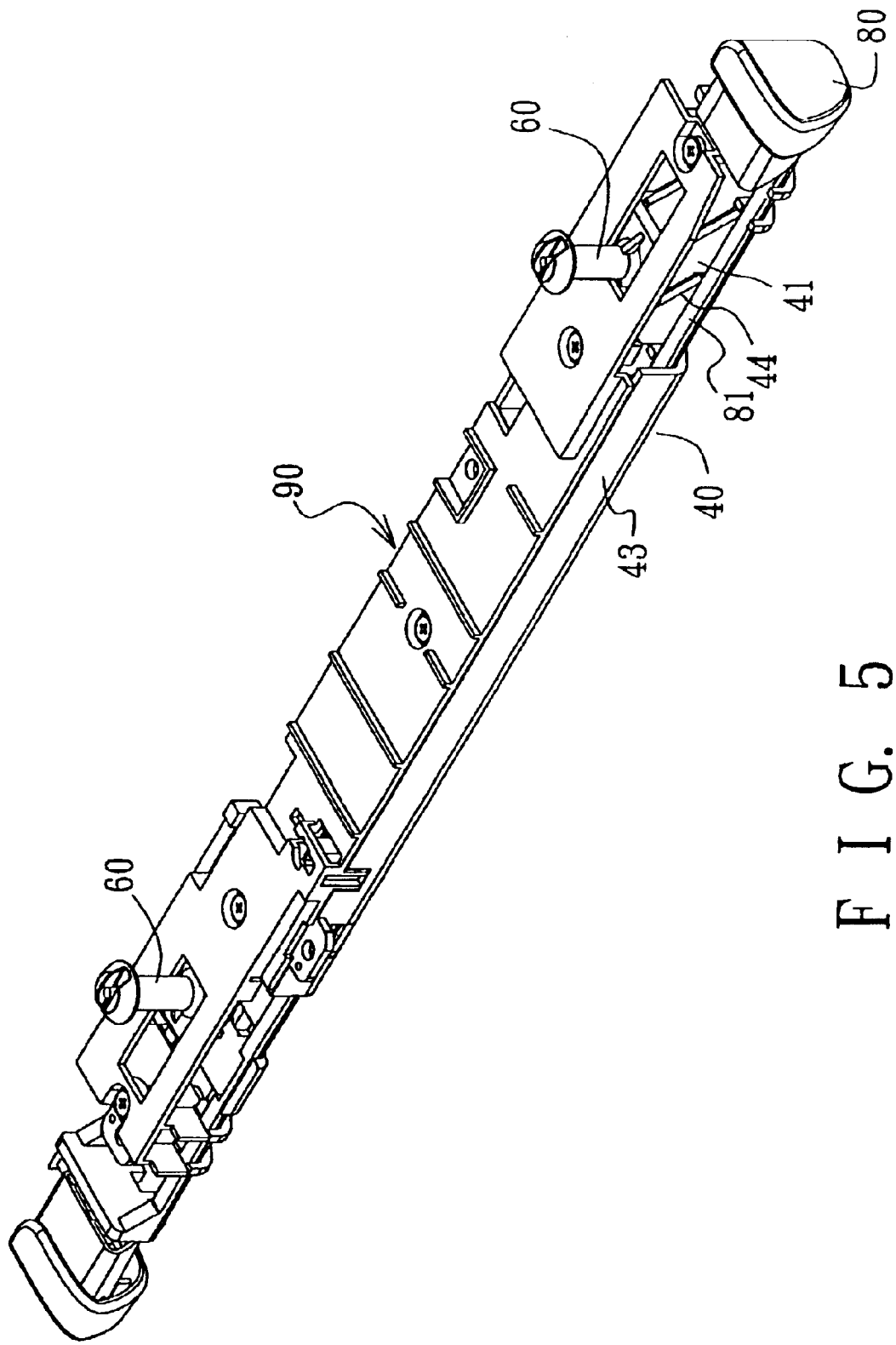
FIG. 5 is a perspective view of the assembled coupling unit of FIG. 3.

The frame part 40 further includes a second abutting plate 508 that projects upwardly from the base plate 403 (see FIG. 4). The extending part 81 has a free end 811 opposite to the button 80. The second tab 803 is disposed between the free end 811 and the button 80. The releasing member 47 further includes a second pin 805 that extends from the free end 811 of the extending part 81 toward the second abutting plate 508, and a third urging member 806 that is sleeved on the second pin 805 and that abuts against the free end 811 of the extending part 81 and the second abutting plate 508 for urging the releasing member 47 to return to the non-releasing position.

Figure 7:
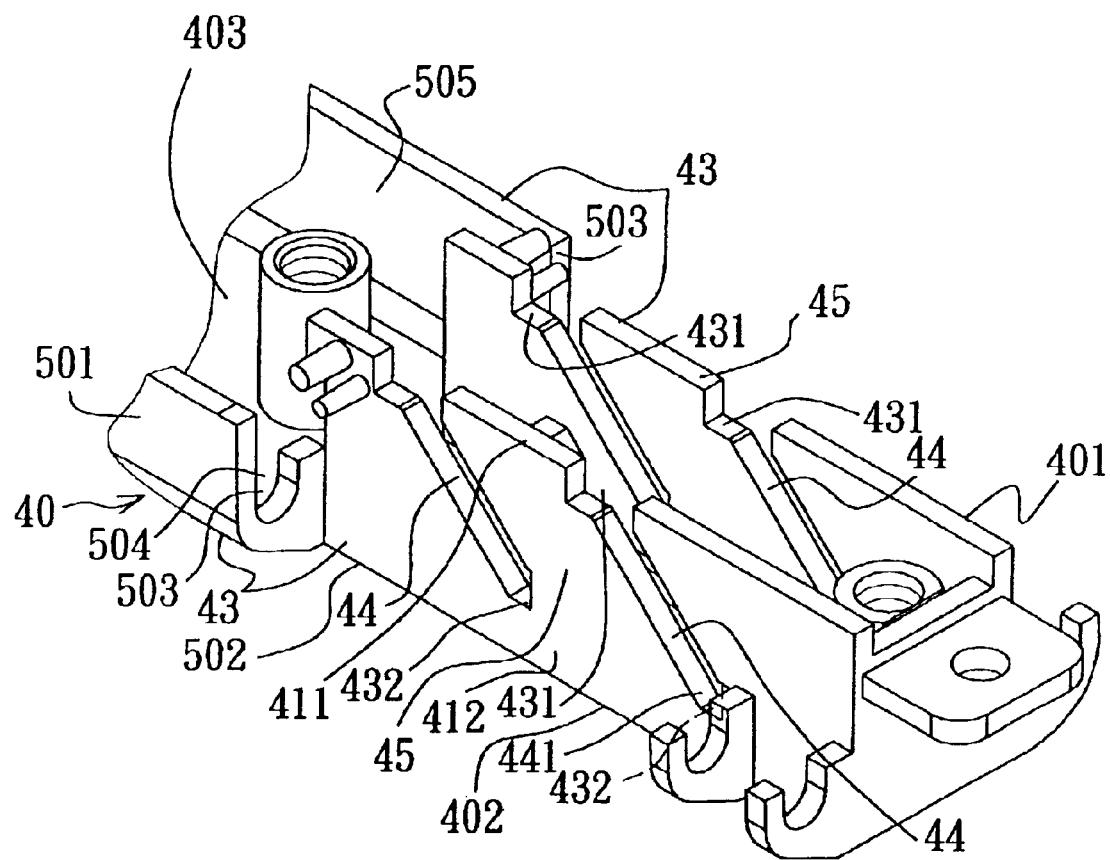
FIG. 7 is a fragmentary perspective view of a frame part of the coupling unit of FIG. 3.
Figure 8:
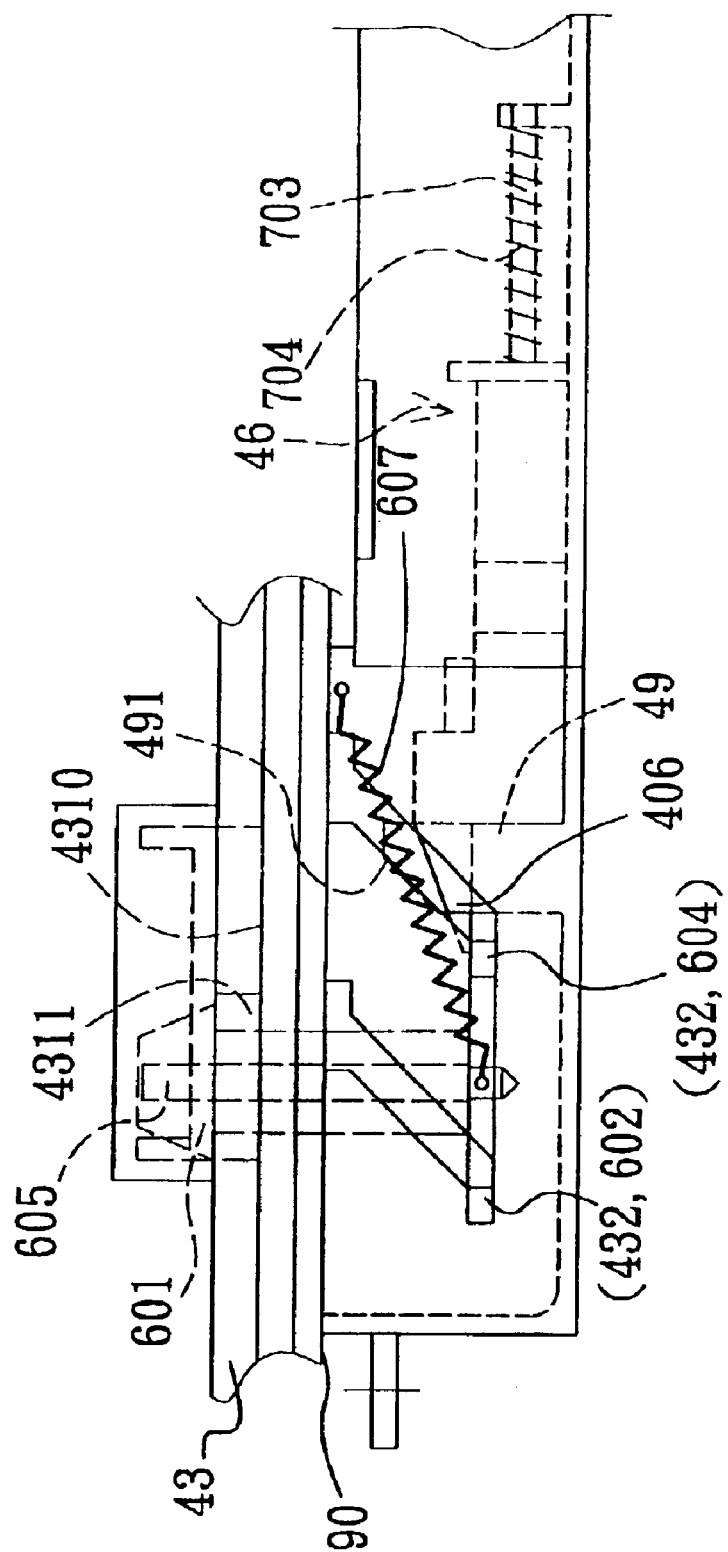
FIG. 8 is a fragmentary side view to illustrate how the engaging member of FIG. 6 is moved to a lower end of a rail member of the coupling unit of FIG. 3.
Figure 9:
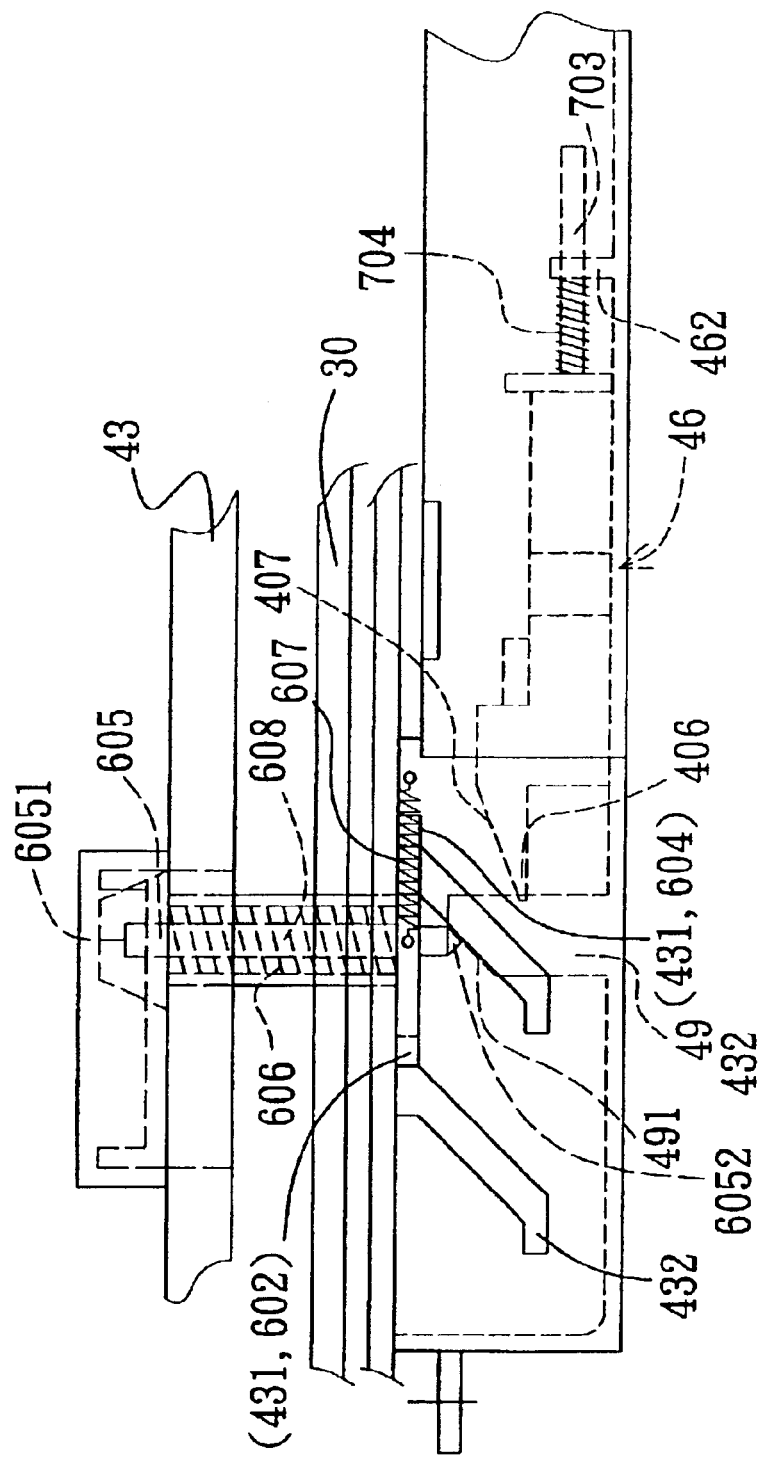
FIG. 9 is a fragmentary side view to illustrate how the engaging member of FIG. 6 is moved to an upper end of the rail member of the coupling unit of FIG. 3.

Referring to FIGS. 4 and 7, each of the side plates 43 of the frame part 40 includes a first section 501 and a second section 502 extending and reduced from the first section 501 to form a shoulder 503 therebetween. The shoulder 503 is formed with a through-hole 504. The first sections 501 of the side plates 43 confine a mounting space 505 therebetween. The inclined grooves 44 are respectively formed in the second sections 502 of the side plates 43. The elongated body 463 of the retaining member 46 is disposed in the mounting space 505. The extending part 81 includes a pair of opposite bars 813 that are respectively connected to the button 80 and the second pin 805, and a pair of parallel rods 814 that interconnect the bars 813 and that extend through the through-holes 504 in the shoulders 503 among the first and second sections 501, 502 of the side plates 43 and into the mounting space 505. The second tabs 803 project respectively from the rods 814 within the mounting space 505.

Figure 6:
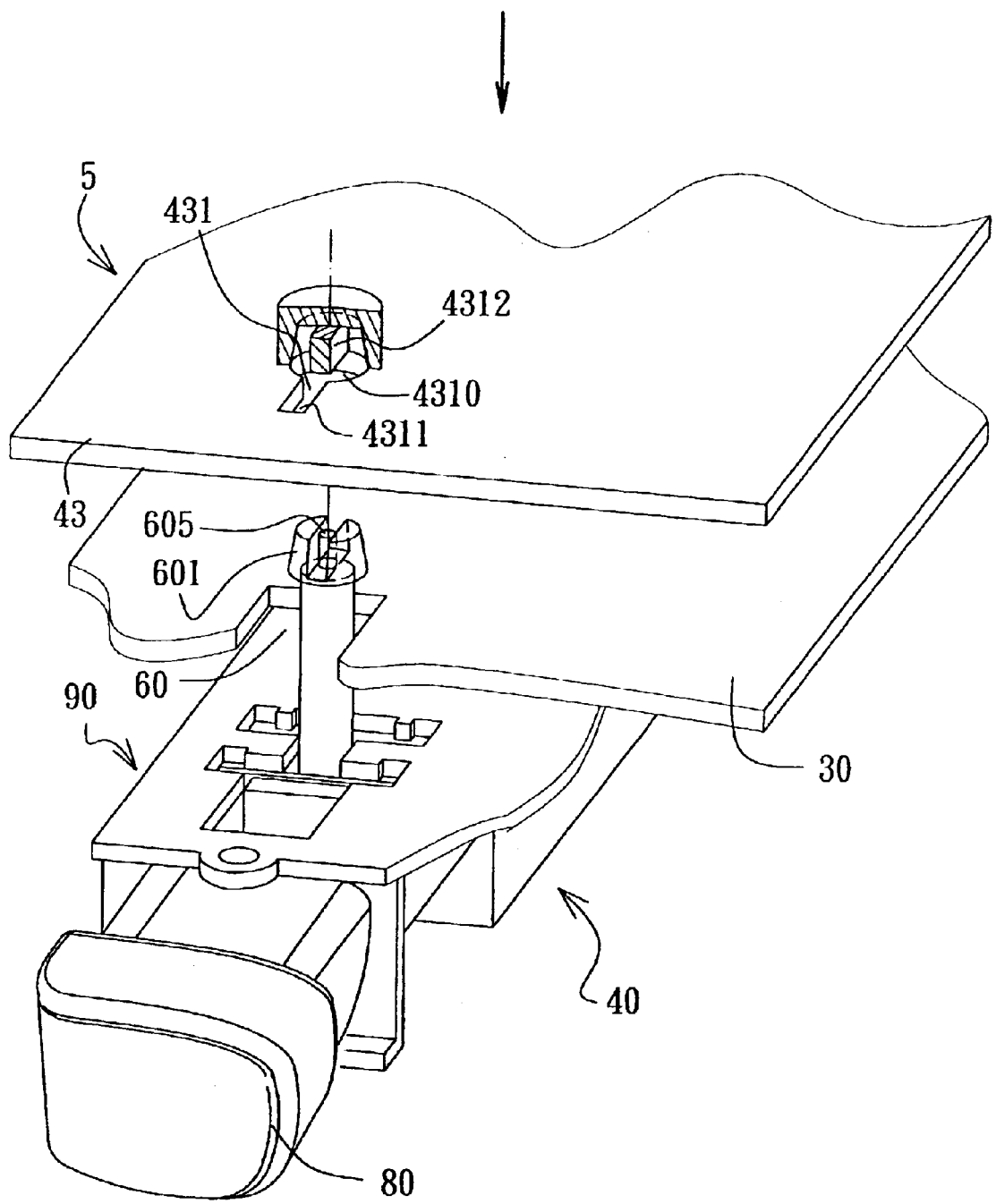
FIG. 6 is a fragmentary perspective view to illustrate how an engaging member of the coupling unit of FIG. 3 engages a slot in a housing of the notebook personal computer.
Figure 10:
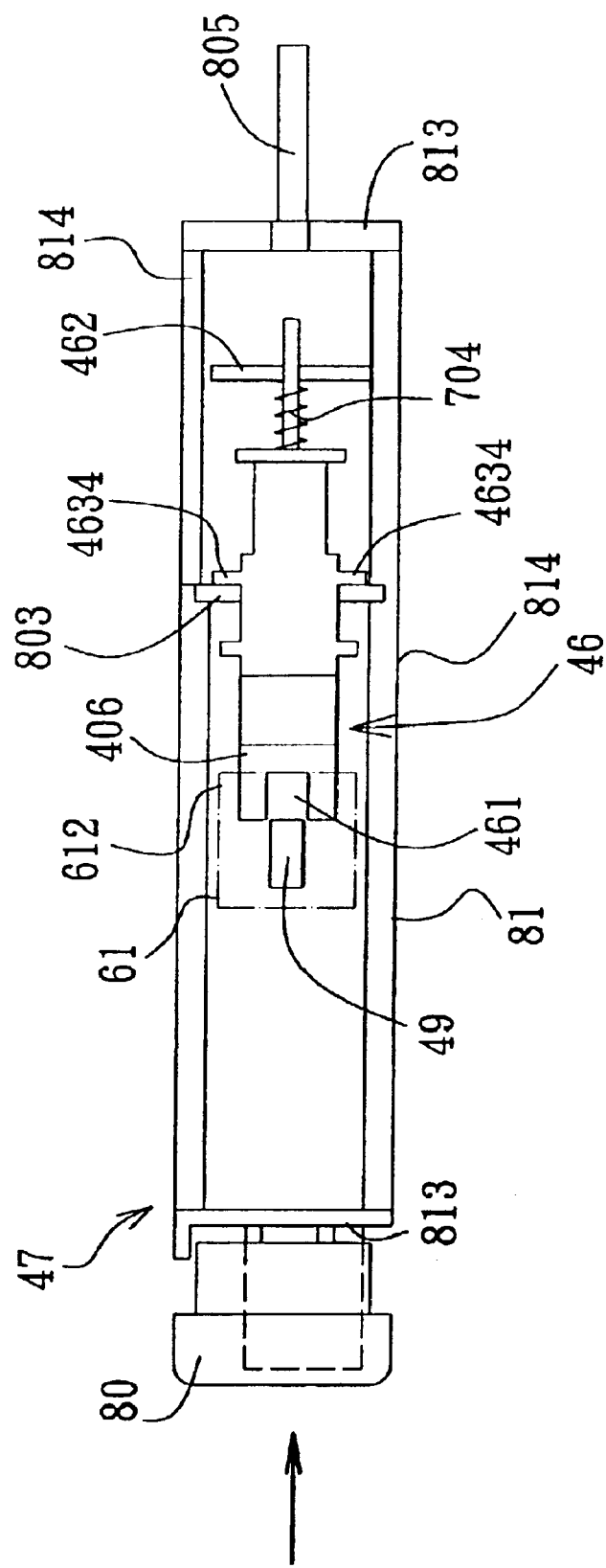
FIG. 10 is a top view to illustrate how a releasing member moves a retaining member to a position for releasing the engaging member of FIG. 6 from the retaining member.
Figure 11:
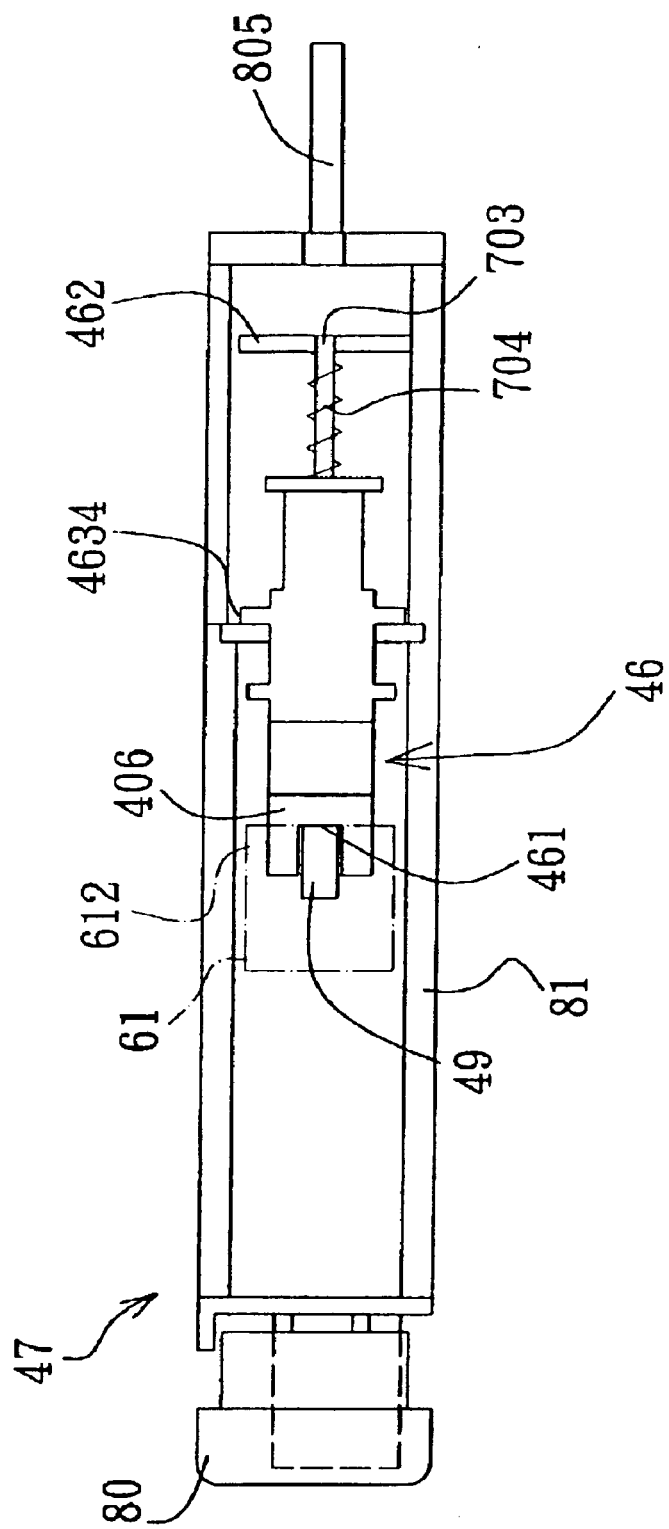
FIG. 11 is a top view to illustrate how the retaining member is restored from the position shown in FIG. 10 to another position upon being released from the releasing member.
Figure 12:
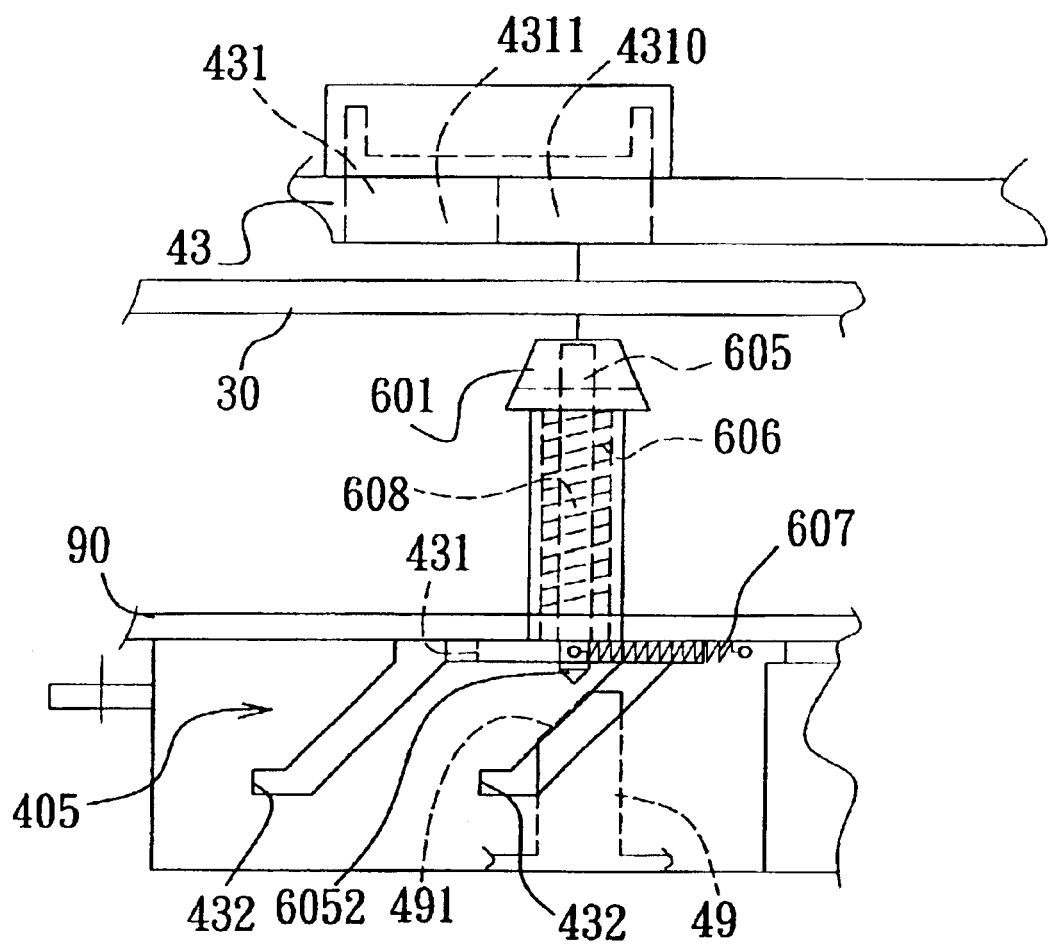
FIG. 12 is a fragmentary side view to illustrate how a guiding post engages a spring-biased pin mounted movably in the engaging member of FIG. 6 for guiding sliding movement of the engaging member.

Referring now to FIGS. 8 to 11, in combination with FIGS. 4 and 6, the retaining tongue 406 of the retaining member 46 is formed with a guiding groove 461 (see FIG. 10). The coupling unit 4 further includes a guiding post 49 that projects upwardly from the base plate 403 through the guiding groove 461, and that is formed with an inclined top face 491 (see FIG. 9). The engaging post 60 has a bottom end opposite to the enlarged top head 601, and is formed with a central channel 608 that extends from the bottom end to the enlarged top head 601. The second engaging member 42 further includes a spring-biased pin 605 that is disposed movably in the central channel 608 and that has a top end 6051 and a bottom tip end 6052. The top end 6051 and the bottom tip end 6052 of the spring-biased pin 605 extend respectively through the top head 601 and the bottom end of the engaging post 60 and the sliding plate 61. The spring-biased pin 605 is movable between an upper position (see FIG. 12), in which the bottom tip end 6052 of the spring-biased pin 605 is disposed above the inclined top face 491 of the guiding post 49, and a lower position (see FIG. 9), in which the bottom tip end 6052 of the spring-biased pin 605 abuts slidably against the inclined top face 491 of the guiding post 49 in such a manner that when the top end 6051 of the spring-biased pin 605 is pushed by a pushing member 4312 of the portable electronic device 5 during mounting of the portable electronic device 5 on the docking wall 30 of the docking station 3 (see FIGS. 6 and 12), the bottom tip end 6052 of the spring-biased pin 605 will slide over the inclined top face 491 of the guiding post 49, thereby providing a guiding function for guiding initial sliding movement of the second engaging member 42 from the upper end 411 of the rail member 41 toward the lower end 412 of the rail member 41. A fourth urging member 606 is sleeved on the spring-biased pin 605 for urging the spring-biased pin 605 to the upper position.

A cover 90 is mounted on the top end 401 of the frame part 40 for covering a top opening in the frame part 40, and is formed with a slot for passage of the engaging post 60 therethrough.

Since the second engaging member 42 of the coupling unit 4 of this invention is capable of positioning and securing the portable electronic device 5 to the docking station 3 without forming a large amount of holes in the housing of the portable electronic device 5, the aforesaid drawback as encountered in the prior art can be eliminated.

With the invention thus explained, it is apparent that various modifications and variations can be made without departing from the spirit of the present invention.

I claim:

1. A coupling unit for docking a portable electronic device to a docking station that is vertically aligned with the portable electronic device along a vertical direction, the portable electronic device being formed with a first engaging member, said coupling unit being adapted to be mounted in the docking station and comprising:

an elongated frame part extending in a longitudinal direction that is adapted to be perpendicular to the vertical direction, having top and bottom ends, and formed with an inclined rail member that extends downwardly and inclinedly relative to the vertical direction and to the longitudinal direction from said top end to said bottom end of said frame part and that has upper and lower ends; and a second engaging member adapted to extend outwardly in the vertical direction through the docking station toward the portable electronic device and mounted slidably on said rail member so as to be slidable along said rail member between said upper and lower ends of said rail member in such a manner that said second engaging member is adapted to engage the first engaging member when positioned at said lower end of said rail member and that said second engaging member is adapted to disengage from the first engaging member when positioned at said upper end of said rail member;

wherein said second engaging member includes a sliding plate extending in the longitudinal direction, and an engaging post projecting upwardly from said sliding plate and adapted to extend outwardly through the docking station toward the portable electronic device to engage the first engaging member of the portable electronic device when said second engaging member is positioned at said lower end of said rail member; and wherein said frame part includes a base plate extending in the longitudinal direction and having two opposite sides, and a pair of parallel side plates extending upwardly and respectively from said opposite sides of said base plate, each of said side plates being formed with a pair of parallel inclined grooves and an inclined rail between said inclined grooves, said inclined rails of said side plates cooperatively defining said inclined rail member, said sliding plate being formed with a pair of parallel elongated openings that extend in the longitudinal direction and that are slidably and respectively sleeved on said inclined rails, thereby permitting sliding movement of said second engaging member along said inclined rails, said engaging post being disposed between said openings.

2. The coupling unit of claim 1, wherein said sliding plate has two opposite sides extending in the longitudinal direction, said coupling unit further comprising a pair of first urging members, each of which has two opposite ends that are respectively connected to a respective one of said side plates of said frame part and a respective one of said opposite sides of said sliding plate so as to urge said second engaging member to move to said upper end of said rail member.

3. The coupling unit of claim 2, wherein each of said inclined grooves in said side plates of said frame part is defined by a groove-defining wall that is formed with an upper recess adjacent to said upper end of said rail member, and has a lower end opposite to said upper recess, each of said side plates being further formed with a pair of lower recesses, each of which extends from said lower end of a respective one of said inclined grooves in the longitudinal direction, said sliding plate having a first end with two opposite corners, and a second end with two opposite corners, said corners of said first and second ends of said sliding plate being respectively received in said upper recesses in said groove-defining walls of said inclined grooves when said second engaging member is positioned at said upper end of said rail member, said corners of said first and second ends of said sliding plate being respectively received in said lower recesses in said side plates when said second engaging member is positioned at said lower end of said rail member.

4. The coupling unit of claim 3, further comprising a retaining member that is disposed movably between said side plates of said frame part adjacent to said second end of said sliding plate, and that has a retaining tongue projecting therefrom, said retaining tongue being formed with an inclined upper face which extends inclinedly relative to said base plate and the vertical direction, said retaining member being movable between a first position, in which said retaining tongue is vertically aligned with said second end of said sliding plate, and a second position, in which said retaining tongue is offset from said second end of said sliding plate in the longitudinal direction, said coupling unit further comprising a second urging member that abuts against and that urges said retaining member to move to said second position, said retaining member being associated with said sliding plate in such a manner that said inclined upper face is disposed beneath said second end of said sliding plate when said retaining member is positioned at said first position while said second engaging member is positioned at said upper end of said rail member, and that said inclined upper face is pushed by and slides over said second end of said sliding plate against the urging action of said second urging member during sliding movement of said second engaging member to said lower end of said rail member, thereby resulting in movement of said retaining member to said second position and disengagement between said second end of said sliding plate and said inclined upper face, which, in turn, results in restoring of said retaining member to said first position by the urging action of said second urging member and disposal of said retaining tongue above said second end of said sliding plate, thereby preventing upward movement of said second engaging member from said lower end of said rail member.

5. The coupling unit of claim 4, wherein said frame part further includes a first abutting plate projecting upwardly from said base plate between said side plates, said retaining member being disposed between said sliding plate and said first abutting plate and including an elongated body that has opposite first and second ends and two opposite side walls extending in the longitudinal direction, said retaining tongue projecting from said first end of said elongated body, said elongated body being formed with a first pin that projects from said second end of said elongated body through said first abutting plate, said second urging member being sleeved on said first pin and abutting against said first abutting plate and said second end of said elongated body, each of said side walls being formed with a first tab that projects outwardly therefrom, said coupling unit further comprising a releasing member that is mounted movably on said frame part and that includes a button adapted to be mounted on an exterior of the docking station for moving said releasing member, an extending part connected to said button and extending therefrom in the longitudinal direction into said frame part, and a second tab projecting from said extending part and abutting against said first tab, said releasing member being movable between a releasing position, in which said retaining member is moved to said second position by pushing action of said second tab against said first tab upon pressing of said button, thereby releasing said second end of said sliding plate from said retaining tongue and permitting upward movement of said second engaging member to said upper end of said rail member, and a non-releasing position, in which said first tab is released from the pushing action of said second tab, thereby resulting in restoring of said retaining member to said first position by the urging action of said second urging member.

6. The coupling unit of claim 5, wherein said frame part further includes a second abutting plate that projects upwardly from said base plate, said extending part having a free end opposite to said button, said second tab being disposed between said free end and said button, said releasing member further including a second pin that extends from said free end of said extending part toward said second abutting plate, and a third urging member that is sleeved on said second pin and that abuts against said free end of said extending part and said second abutting plate for urging said releasing member to return to said non-releasing position.

7. The coupling unit of claim 6, wherein each of said side plates of said frame part includes a first section and a second section extending and reduced from said first section to form a shoulder therebetween, said shoulder being formed with a through-hole, said first sections of said side plates confining a mounting space therebetween, said inclined grooves being respectively formed in said second sections of said side plates, said elongated body of said retaining member being disposed in said mounting space, said extending part including a pair of opposite bars that are respectively connected to said button and said second pin, and a pair of parallel rods that interconnect said bars and that extend through said through-holes in said shoulders among said first and second sections of said side plates and into said mounting space, said second tab projecting from one of said rods within said mounting space.

8. A coupling unit for coupling a docking station to a portable electronic device that is vertically aligned with the docking station along a vertical direction, the docking station having a top docking wall, the portable electronic device having a bottom mounting wall that is adapted to be mounted on the top docking wall and that is formed with an elongated slot which extends in a longitudinal direction perpendicular to the vertical direction and which has an enlarged end and an extension extending and reduced from the enlarged end in the longitudinal direction, said coupling unit being adapted to be mounted in the docking station and comprising:

an elongated frame part extending in the longitudinal direction, having top and bottom ends, and formed with an inclined rail member that extends downwardly and inclinedly relative to the vertical direction and to the longitudinal direction from said top end to said bottom end of said frame part and that has upper and lower ends; and a second engaging member including an engaging post that has an enlarged top head and that is adapted to extend outwardly and upwardly in the vertical direction through the top docking wall of the docking station and the enlarged end of the elongated slot and into the portable electronic device, said enlarged top head of said engaging post having a cross-section smaller that that of the enlarged end of the elongated slot and greater than that of the extension of the elongated slot, said second engaging member being mounted slidably on said rail member so as to be slidable along said rail member between said upper and lower ends of said rail member in such a manner that said engaging post is adapted to move to the extension of the elongated slot and that said enlarged top head engages releasably a periphery of the extension of the elongated slot when positioned at said lower end of said rail member, thereby preventing separation of the portable electronic device from the docking station, and that said engaging post is adapted to move away from the extension of the elongated slot to the enlarged end of the elongated slot when positioned at said upper end of said rail member, thereby permitting separation of the portable electronic device from the docking station;

wherein said second engaging member includes a sliding plate extending in the longitudinal direction, said engaging post projecting upwardly from said sliding plate, said frame part including a base plate extending in the longitudinal direction and having two opposite sides, and a pair of parallel side plates extending upwardly and respectively from said opposite sides of said base plate, each of said side plates being formed with a pair of parallel inclined grooves and an inclined rail between said inclined grooves, said inclined rails of said side plates cooperatively defining said inclined rail member, said sliding plate being formed with a pair of parallel elongated openings that extend in the longitudinal direction and that are slidably and respectively sleeved on said inclined rails, thereby permitting sliding movement of said second engaging member along said inclined rails, said engaging post being disposed between said openings.

9. The coupling unit of claim 8, wherein said sliding plate has two opposite sides extending in the longitudinal direction, said coupling unit further comprising a pair of first urging members, each of which has two opposite ends that are respectively connected to a respective one of said side plates of said frame part and a respective one of said opposite sides of said sliding plate so as to urge said second engaging member to move to said upper end of said rail member.

10. The coupling unit of claim 9, wherein each of said inclined grooves in said side plates of said frame part is defined by a groove-defining wall that is formed with an upper recess adjacent to said upper end of said rail member, and has a lower end opposite to said upper recess, each of said side plates being further formed with a pair of lower recesses, each of which extends from said lower end of a respective one of said inclined grooves in the longitudinal direction, said sliding plate having a first end with two opposite corners, and a second end with two opposite corners, said corners of said first and second ends of said sliding plate being respectively received in said upper recesses in said groove-defining walls of said inclined grooves when said second engaging member is positioned at said upper end of said rail member, said corners of said first and second ends of said sliding plate being respectively received in said lower recesses in said side plates when said second engaging member is positioned at said lower end of said rail member.

11. The coupling unit of claim 10, further comprising a retaining member that is disposed movably between said side plates of said frame part adjacent to said second end of said sliding plate, and that has a retaining tongue projecting therefrom, said retaining tongue being formed with an inclined upper face which extends inclinedly relative to said base plate and the vertical direction, said retaining member being movable between a first position, in which said retaining tongue is vertically aligned with said second end of said sliding plate, and a second position, in which said retaining tongue is offset from said second end of said sliding plate in the longitudinal direction, said coupling unit further comprising a second urging member that abuts against and that urges said retaining member to move to said second position, said retaining member being associated with said sliding plate in such a manner that said inclined upper face is disposed beneath said second end of said sliding plate when said retaining member is positioned at said first position while said second engaging member is positioned at said upper end of said rail member, and that said inclined upper face is pushed by and slides over said second end of said sliding plate against the urging action of said second urging member during sliding movement of said second engaging member to said lower end of said rail member, thereby resulting in movement of said retaining member to said second position and disengagement between said second end of said sliding plate and said inclined upper face, which, in turn, results in restoring of said retaining member to said first position by the urging action of said second urging member and disposal of said retaining tongue above said second end of said sliding plate, thereby preventing upward movement of said second engaging member from said lower end of said rail member.

12. The coupling unit of claim 11, wherein said retaining tongue of said retaining member is formed with a guiding groove, said coupling unit further comprising a guiding post that projects upwardly from said base plate through said guiding groove, and that is formed with an inclined top face, said engaging post having a bottom end opposite to said enlarged top head and being formed with a central channel that extends from said bottom end to said enlarged top head, said second engaging member further including a spring-biased pin that is disposed movably in said central channel and that has a top end and a bottom tip end, said top end and said bottom tip end of said spring-biased pin extending respectively through said top head and said bottom end of said engaging post and said sliding plate, said spring-biased pin being movable between an upper position, in which said bottom tip end of said spring-biased pin is disposed above said inclined top face of said guiding post, and a lower position, in which said bottom tip end of said spring-biased pin abuts slidably against said inclined top face of said guiding post in such a manner that when said spring-biased pin is pushed by the portable electronic device during mounting of the portable electronic device on the docking wall of the docking station, said bottom tip end of said spring-biased pin will slide over said inclined top face of said guiding post, thereby providing a guiding function for guiding initial sliding movement of said second engaging member from said upper end of said rail member toward said lower end of said rail member.

* * * * *